United States Patent
Karschnia (10) Patent No.: US 8,050,875 B2
(45) Date of Patent: Nov. 1, 2011

(54) STEAM TRAP MONITORING

(75) Inventor: Robert J. Karschnia, Chaska, MN (US)

(73) Assignee: Rosemount Inc., Eden Prairie, MN (US)

(*) Notice: Subject to any disclaimer, the term of this patent is extended or adjusted under 35 U.S.C. 154(b) by 32 days.

(21) Appl. No.: 11/645,821

(22) Filed: Dec. 26, 2006

(65) Prior Publication Data
US 2008/0150737 A1 Jun. 26, 2008

(51) Int. Cl.
*G01N 25/60* (2006.01)
*G01N 27/14* (2006.01)
*G01R 21/02* (2006.01)
*G01R 22/00* (2006.01)

(52) U.S. Cl. .......... 702/51; 702/50; 702/60; 702/62

(58) Field of Classification Search .......... 702/45, 702/56, 108, 179, 182–185, 187; 73/579, 73/662; 236/94, 54; 137/1, 179
See application file for complete search history.

(56) References Cited

U.S. PATENT DOCUMENTS

| | | | |
|---|---|---|---|
| 3,060,377 A | 10/1962 | Schmidt | 324/220 |
| 3,204,455 A | 9/1965 | Kallmann | 73/861.26 |
| 3,406,342 A | 10/1968 | Hubner | 325/2 |
| 3,625,057 A | 12/1971 | Yoshiyama et al. | 73/861.27 |
| 3,764,984 A | 10/1973 | McCartney | 340/168 |
| 4,160,239 A | 7/1979 | Adamson | 340/152 |
| 4,249,697 A | 2/1981 | Savage, Jr. | 236/94 |
| 4,333,339 A | 6/1982 | McNeely et al. | 116/217 |
| 4,481,503 A | 11/1984 | Lehman et al. | 340/518 |
| 4,511,887 A | 4/1985 | Fiore | 340/539 |
| 4,575,258 A | 3/1986 | Wall | 374/104 |
| 4,605,065 A | 8/1986 | Abercrombie | 166/250 |
| 4,630,633 A | 12/1986 | Vallery | 137/185 |
| 4,649,898 A | 3/1987 | Martinson | 126/369 |
| 4,665,385 A | 5/1987 | Henderson | 340/539 |
| 4,705,212 A * | 11/1987 | Miller et al. | 236/54 |
| 4,764,024 A | 8/1988 | Ryan | 374/39 |
| 4,783,987 A | 11/1988 | Hager et al. | 73/32 A |
| 4,788,849 A | 12/1988 | Yonemura et al. | 73/40.5 |
| 4,898,022 A | 2/1990 | Yumoto et al. | 73/46 |
| 4,937,558 A | 6/1990 | Robinet et al. | 340/606 |
| 4,945,343 A | 7/1990 | Rodriguez | 340/606 |
| 4,960,079 A | 10/1990 | Marziale et al. | 122/504.2 |
| 5,003,295 A | 3/1991 | Kleven | 340/581 |

(Continued)

FOREIGN PATENT DOCUMENTS

AU 8477798 8/1999

(Continued)

OTHER PUBLICATIONS

Notification of Transmittal of the International Search Report and the Written Opinion—PCT/US2005/028980.

(Continued)

*Primary Examiner* — Mohamed Charioui
*Assistant Examiner* — Felix E Suarez
(74) *Attorney, Agent, or Firm* — Westman, Champlin & Kelly, P.A.

(57) ABSTRACT

An electronic steam trap monitor includes an electric generator configure to couple to a stream trap proximate a potential leak location. The generator generates electricity in response to a process variable from the potential leak location. Communication circuitry provides an output when there is sufficient electricity from the electric generator.

14 Claims, 5 Drawing Sheets

U.S. PATENT DOCUMENTS

| | | | |
|---|---|---|---|
| 5,101,774 A | 4/1992 | Marziale et al. | 122/504.2 |
| 5,208,162 A | 5/1993 | Osborne et al. | 436/6 |
| 5,329,465 A | 7/1994 | Arcelia et al. | 364/551.01 |
| 5,372,046 A | 12/1994 | Kleven et al. | 73/861.22 |
| 5,400,645 A | 3/1995 | Kunze et al. | 73/40.5 |
| 5,408,867 A | 4/1995 | Kunze et al. | 73/40.5 |
| 5,429,001 A | 7/1995 | Kleven | 73/861.22 |
| 5,433,104 A | 7/1995 | Kunze et al. | 73/40.5 |
| 5,491,092 A | 2/1996 | Colvin | 436/1 |
| 5,509,311 A | 4/1996 | Lew | 73/661 |
| 5,517,537 A | 5/1996 | Greene et al. | 376/252 |
| 5,519,330 A | 5/1996 | Yamauchi et al. | 324/700 |
| 5,533,383 A | 7/1996 | Greene et al. | 73/40.5 |
| 5,571,944 A | 11/1996 | Pfeifer et al. | 73/24.04 |
| 5,594,180 A | 1/1997 | Carpenter et al. | 73/861.356 |
| 5,597,534 A | 1/1997 | Kaiser | 422/82.02 |
| 5,606,513 A | 2/1997 | Louwagie et al. | 364/510 |
| 5,646,338 A | 7/1997 | Mercusot et al. | 73/86 |
| 5,650,943 A | 7/1997 | Powell et al. | 364/550 |
| 5,691,896 A | 11/1997 | Zou et al. | 364/157 |
| 5,734,098 A | 3/1998 | Kraus et al. | 73/61.62 |
| 5,741,978 A | 4/1998 | Gudmundsson | 73/861.04 |
| 5,788,147 A | 8/1998 | Navarro | 236/59 |
| 5,926,096 A | 7/1999 | Mattar et al. | 340/606 |
| 5,992,436 A | 11/1999 | Hellman et al. | 137/1 |
| 6,123,144 A | 9/2000 | Morman et al. | 165/104.32 |
| 6,145,529 A | 11/2000 | Hellman et al. | 137/1 |
| 6,186,004 B1 | 2/2001 | Kaduchak et al. | 73/596 |
| 6,279,593 B1* | 8/2001 | Sheppard | 137/1 |
| 6,290,778 B1 | 9/2001 | Zugibe | 134/1 |
| 6,332,112 B1* | 12/2001 | Shukunami et al. | 702/56 |
| 6,338,283 B1 | 1/2002 | Blazquez Navarro et al. | 73/865.8 |
| 6,367,328 B1 | 4/2002 | Gorman et al. | 73/592 |
| 6,453,247 B1 | 9/2002 | Hunaidi | 702/51 |
| 6,471,823 B1 | 10/2002 | Stewart | 159/47.1 |
| 6,571,180 B1* | 5/2003 | Turner et al. | 702/45 |
| 6,594,603 B1 | 7/2003 | Eryurek et al. | 702/104 |
| 6,595,059 B2 | 7/2003 | Gorman et al. | 73/592 |
| 6,601,005 B1 | 7/2003 | Eryurek et al. | 702/104 |
| 6,606,573 B2 | 8/2003 | Wheeler | 702/56 |
| 6,675,665 B2 | 1/2004 | Blazquez Navarro et al. | 73/865.8 |
| 6,717,658 B1 | 4/2004 | Saini et al. | 356/70 |
| 6,725,705 B1 | 4/2004 | Huebler et al. | 73/40.5 |
| 6,782,762 B2 | 8/2004 | Cage | 73/861.355 |
| 6,804,992 B2 | 10/2004 | Goodman et al. | 73/40.5 |
| 6,871,148 B2 | 3/2005 | Morgen et al. | 702/48 |
| 6,891,477 B2 | 5/2005 | Aronstam | 340/606 |
| 6,912,918 B1 | 7/2005 | Lynnworth et al. | 73/861.26 |
| 6,977,815 B2 | 12/2005 | Hsu | 361/704 |
| 7,043,969 B2 | 5/2006 | Matsiev et al. | 73/54.41 |
| 7,069,802 B2 | 7/2006 | Mikhail et al. | 74/410 |
| 7,148,611 B1 | 12/2006 | Liu | 310/366 |
| 7,203,626 B2* | 4/2007 | Quake et al. | 702/189 |
| 7,246,036 B2* | 7/2007 | Cheskaty et al. | 702/183 |
| 7,290,450 B2* | 11/2007 | Brown et al. | 73/579 |
| 7,385,503 B1 | 6/2008 | Wells et al. | 340/539.26 |
| 7,579,947 B2* | 8/2009 | Peluso | 340/539.26 |
| 7,664,610 B2 | 2/2010 | Anderson et al. | 702/60 |
| 7,702,484 B2 | 4/2010 | Armstrong et al. | 702/183 |
| 2001/0033631 A1 | 10/2001 | Sakamaki | 376/305 |
| 2002/0029572 A1 | 3/2002 | Kangai et al. | 60/685 |
| 2002/0078752 A1 | 6/2002 | Braunling et al. | 73/592 |
| 2002/0120422 A1 | 8/2002 | Nagase | 702/127 |
| 2002/0124666 A1 | 9/2002 | Navarro et al. | 73/865.8 |
| 2003/0041653 A1 | 3/2003 | Matsiev et al. | 73/54.25 |
| 2003/0042007 A1 | 3/2003 | Sandu et al. | 165/94 |
| 2003/0056607 A1 | 3/2003 | Aronstam | 73/865.8 |
| 2003/0118150 A1 | 6/2003 | Hirabayashi et al. | 378/59 |
| 2003/0183537 A1 | 10/2003 | Eden et al. | 205/775.5 |
| 2004/0012264 A1 | 1/2004 | Burger et al. | 307/64 |
| 2004/0090866 A1 | 5/2004 | Goodman et al. | 367/135 |
| 2005/0011278 A1 | 1/2005 | Brown et al. | 73/861.18 |
| 2005/0145019 A1 | 7/2005 | Matsiev et al. | 73/53.01 |
| 2005/0189017 A1 | 9/2005 | Eryurek | 137/487.5 |
| 2006/0037399 A1 | 2/2006 | Brown | 73/580 |
| 2006/0113960 A1 | 6/2006 | Thulesius et al. | 320/133 |
| 2006/0118647 A1 | 6/2006 | Cheskaty et al. | 236/93 |
| 2006/0118648 A1 | 6/2006 | Armstrong et al. | 236/93 |
| 2006/0122808 A1 | 6/2006 | Quake et al. | 702/183 |
| 2006/0174707 A1 | 8/2006 | Zhang | 73/592 |
| 2007/0073495 A1 | 3/2007 | Anderson et al. | 702/50 |

FOREIGN PATENT DOCUMENTS

| | | |
|---|---|---|
| CA | 2173794 | 4/1996 |
| DE | 39 13 715 A1 | 11/1989 |
| DE | 4320395 | 6/1993 |
| EP | 0697586 | 2/1996 |
| EP | 0718342 | 6/1996 |
| EP | 0949447 | 10/1999 |
| EP | 0 972 982 A2 | 1/2000 |
| EP | 1 280 026 A1 | 1/2003 |
| FR | 2395458 | 6/1977 |
| GB | 2 231 407 A | 11/1990 |
| GB | 2231407 | 11/1990 |
| GB | 2266956 | 11/1993 |
| JP | 59176643 | 10/1984 |
| JP | 61050008 | 3/1986 |
| JP | 62080535 | 4/1987 |
| JP | 63169532 | 7/1988 |
| JP | 01109235 | 4/1989 |
| JP | 01124739 | 5/1989 |
| JP | 01187430 | 7/1989 |
| JP | 1210700 | 8/1989 |
| JP | 01311242 | 12/1989 |
| JP | 02059637 | 2/1990 |
| JP | 02107897 | 4/1990 |
| JP | 02141637 | 5/1990 |
| JP | 02291937 | 12/1990 |
| JP | 03037541 | 2/1991 |
| JP | 03110436 | 5/1991 |
| JP | 03249534 | 11/1991 |
| JP | 05066172 | 3/1993 |
| JP | 05010844 | 1/1994 |
| JP | 08021780 | 1/1996 |
| JP | 08110328 | 4/1996 |
| JP | 08304220 | 11/1996 |
| JP | 09061283 | 3/1997 |
| JP | 2005214666 | 8/2005 |
| JP | 2003 315254 A | 11/2007 |
| WO | WO98/10218 | 3/1998 |
| WO | WO 98/46975 | 10/1998 |
| WO | WO99/39129 | 8/1999 |
| WO | WO00/16059 | 3/2000 |
| WO | WO 01/73382 | 10/2001 |
| WO | WO2006/063197 | 6/2006 |

OTHER PUBLICATIONS

Decca, R.S.; Drew, H.D.; Empson, K.L. Mechanical Oscillator Tip-To-Sample Separation Control for Near-Field Optical Microscopy American Institute of Physics, 1997, pp. 1291-1295.

G. Asti et al. "The Activated Torsion Oscillation Magnetometer," Parma Italy, pp. 1-6.

Schmidt, Stepfan and Grimes, Craig A. "Elastic Modulus Measurement of Thin Films Coated onto Magnetelastic Ribbons," IEEE Transactions on Magnetics, vol. 37, No. 4, Jul. 2001, pp. 2731-2733.

Search Report and Written Opinion of the foreign application No. PCT/US2006/036415 filed Sep. 19, 2006.

"Notification of Transmittal of the International Search Report and the Written Opinion of the International Searching Authority, or the Declaration" from related foreign patent application No. PCT/US2007/025359 dated Oct. 30, 2009; 15 pages.

Official Action from Russian patent application No. 2008116693m dated Jun. 23, 2009.

Communication in European patent application No. 06803830.6, dated Oct. 7, 2008.

Communication in European patent application No. 06803830.6, dated Nov. 17, 2009.

Official Communication from Chinese patent application No. 200680032493.0, dated Sep. 18, 2009.

"Technical Overview of Time Synchronized Mesh Protocol (TSMP)", Dust Networks, Document No. 025-0003-01, Last revised: Jun. 20, 2006, 18 pages.

"Introducing SteamEye®—wireless technology that lets you monitor any trap, anytime, anywhere.", www.armstrong-intl.com; © Armstrong International, Inc., 19 pages.

"R. Stahl's Intrinsic Safety Primer", R. Stahl, Inc., prior to Jan. 2011; 15 pages.

"Intrinsic Safety", Jacques Oudar, Journal of the Southern California Meter Association, Oct. 1981; 6 pages.

"Installation and Operating Instructions Model TA4500 TrapAlert™"; prior to Jan. 2011; one page.

"Model TA4500 TrapAlert", Armstrong International, Inc., IB-125 3.5M Apr. 1994; 26 pages.

"Why Inovonics 900 MHz Wireless? 3 Distinct reasons make it the Best!", prior to Jan. 2011; 5 pages.

FA464DR Specifications, prior to Jan. 2011, one page.

Chinese Office Action from corresponding application No. CN200780026755.7, dated Mar. 24, 2011, 5 pgs.

Communication in European patent application No. 07853343.7, dated Apr. 29, 2010.

* cited by examiner

STEAM TRAP MONITORING

BACKGROUND OF THE INVENTION

The present invention is related to the monitoring of steam traps. More particularly, the present invention is related to a system and method for detecting a leak in a steam trap.

Steam traps are commonly used in many industries to remove unwanted air and condense it from steam lines. In a typical plant, thousands of such devices may be deployed. A steam trap is generally a relatively low technology device that is designed to be relatively inexpensive. Often, steam traps are completely mechanical. Adding any electrical wiring for either power or monitoring would be considered cost prohibitive, impractical and/or labor intensive.

A steam trap is generally designed to allow condensate to escape a pipe in order to maintain efficiency and reduce pipe "knocking." A typical steam trap may have one or more chambers and a member that is in physical contact with the condensate. As the level of the condensate rises above some threshold, the movable member within the steam trap actuates, or otherwise engages one or more valves to allow the condensate to escape. As the condensate escapes, the level of condensate within the steam trap is reduced to such an extent that the valve is closed and the trap re-pressurizes.

Steam traps experience a very common problem; they often leak. Steam trap leakage is often due to wear of the movable member within the steam trap, deterioration or fouling of the valve(s), or a number of other reasons. Regardless of the cause, steam trap leakage is undesirable for a number of reasons. First, it takes a relatively large amount of energy to heat water into steam. Thus, a leaking steam trap will allow steam to escape before the energy content therein can be fully utilized. Further, many condensate removal systems are not designed for continuous pressurization, such as that caused by a steam leak. Accordingly, the component(s) downstream from a steam trap could be damaged, or otherwise degraded, by a continuous steam leak. Finally, given a sufficient leak, the steam pipe may not be able to supply sufficient steam pressure and flow to achieve its desired purpose.

Accordingly, it is believed that users of steam traps would desire the ability to determine if one or more of their steam traps were leaking. Currently, methods used to monitor steam traps require providing cable runs to the steam trap, or rely on non-electrical approaches.

SUMMARY

An electronic steam trap monitor, including an electric generator configure to couple to a stream trap proximate a potential leak location. The generator generates electricity in response to a process variable from the potential leak location. Communication circuitry provides an output when the electricity from the electric generator is at sufficient level

DETAILED DESCRIPTION OF THE ILLUSTRATIVE EMBODIMENT

Embodiments of the present invention can be practiced with respect to any steam trap that has an inlet that is coupled, or couplable, to a steam pipe, and an outlet that periodically releases condensate and/or air, but otherwise is expected to maintain an elevated pressure with respect to the ambient environment.

Figure 1:
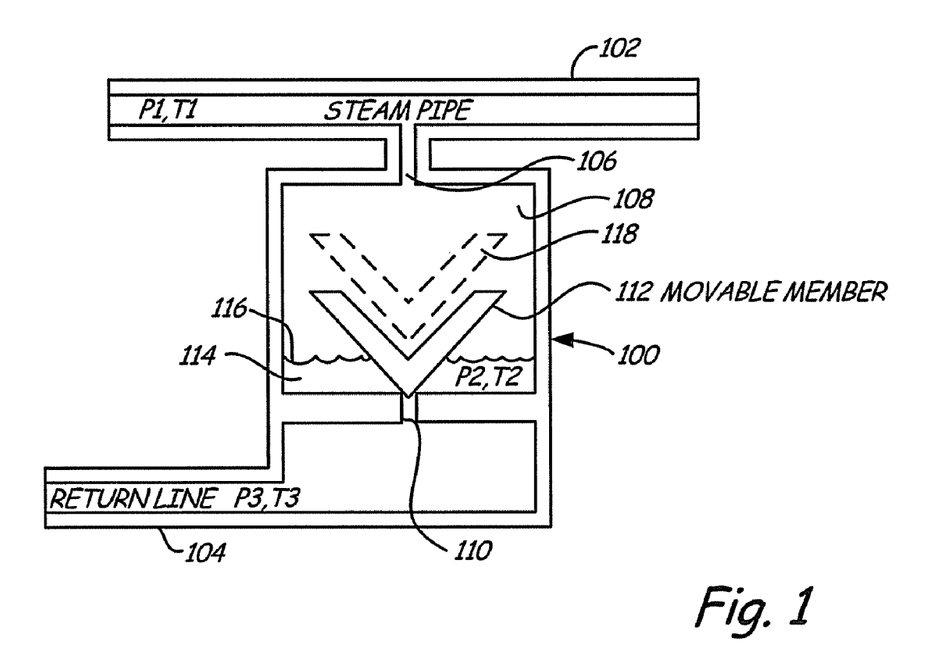
FIG. 1 is a diagrammatic view of a steam trap with which embodiments of the present invention are useful.

FIG. 1 is a diagrammatic view of a steam trap with which embodiments of the present invention are useful. Steam trap 100 is fluidically coupled to steam pipe 102 and water collection/return line 104. Steam pipe 102 has steam disposed therein at first pressure (P1) and first temperature (T1). The steam may be static or flowing, and may be saturated steam or superheated steam. Condensate flowing, or otherwise present within steam pipe 102 will flow into inlet 106 and accumulate in the chamber 108. Chamber 108 includes an outlet port 110 that is closed or occluded by movable member 112. Movable member 112 may comprise a baffle or any other suitable physical structure. As condensate 114 accumulates within chamber 108, the level 116 of condensate 114 rises. As the level rises, the amount of condensate displaced by movable member 112 increases thereby increasing the degree to which the buoyancy of member 112 urges member 112 upward. At some point, the level of condensate 114 will reach a threshold where movable member 112 lifts into the position indicated in phantom at reference numeral 118. Once member 112 lifts, condensate 114 drains through outlet 110 for a short period of time. Once sufficient condensate 114 has drained, gravity will bring member 112 down into contact with outlet 110 thereby sealing outlet 110. In this manner, steam trap 100 will periodically release quantities of condensate 114 and some air and steam. During these intervals while condensate is being released, a temperature (T3) and a pressure (P3) will be relatively higher than when member 112 seals outlet 110.

Figure 2:
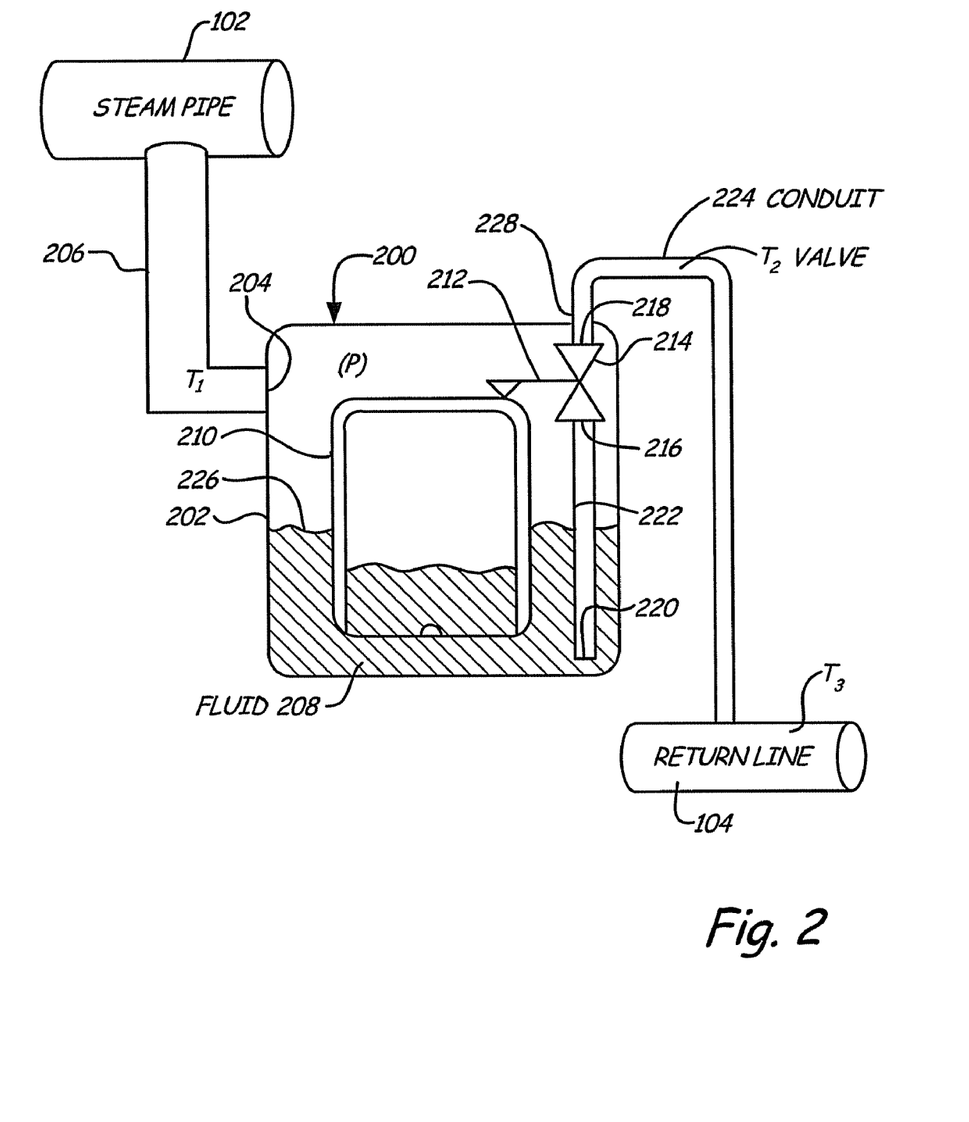
FIG. 2 is a diagrammatic view of another steam trap with which embodiments of the present invention are useful.

FIG. 2 is a diagrammatic view of another steam trap with which embodiments of the present invention are useful. Steam trap 200 is coupled to steam pipe 102 and return line 104. Trap 200 includes trap body 202 that is coupled to, or includes, inlet 204 that is fluidically coupled to steam pipe 102. Accordingly, condensate, or other liquids, flowing or otherwise present within steam pipe 102 will descend conduit 206 and enter trap body 202 via inlet 204. Fluid 208 thus accumulates within trap body 202. Float 210 is disposed within trap body 202 and is configured to float upon a selected amount of fluid 208. As float 210 rises, it will eventually come into contact with movable member 212 of valve 214. When float 210 moves member 212 sufficiently, valve 214 will open thereby coupling upstream portion 216 to downstream portion 218. Upstream portion 216 is fluidically coupled to location 220 proximate the bottom of trap body 202. Accordingly, fluid 208 proximate location 220 will flow into conduit 222; through valve 214; through conduit 224 and into return line 104. The flow of fluid 208 is facilitated by the relatively higher pressure within steam line 102, which pressure (P) bears against surface 226 of fluid 208.

The temperature of inlet 204 is illustrated as T1, while the temperature proximate outlet 228 is illustrated as T2. The temperature of condensate within return line 104 is at T3.

In order to allow embodiments of the present invention to be practiced with existing, or legacy, mechanical steam traps, it is preferred that no modifications need to be made to such devices. Thus, embodiments of the present invention are generally directed to providing steam trap monitoring for any steam trap that has an inlet and an outlet that periodically releases condensate without necessitating any modification to the steam trap itself, or requiring any wiring to be run to the steam trap.

Figure 3A:
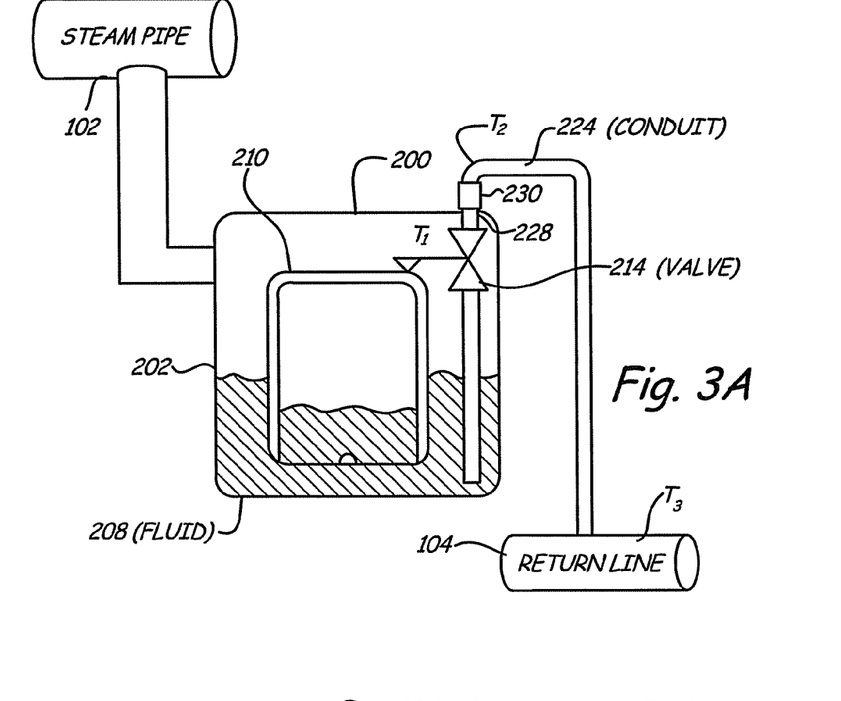
FIG. 3A is a diagrammatic view of a steam trap monitoring system coupled to a steam trap in accordance with an embodiment of the present invention.

FIG. 3A is a diagrammatic view of a steam trap monitoring system coupled to a steam trap in accordance with an embodiment of the present invention. For simplicity, the steam trap illustrated in FIG. 3A is steam trap 200 described with respect to FIG. 2. However, any steam trap may be used, as set forth above. Steam trap monitor 230 is coupled to outlet 228 of steam trap 200. For the sake of illustration, assume 300# saturated steam is provided within steam pipe 102. At this pressure the steam temperature is approximately 412° F. Accordingly, the temperature within steam trap 200 will also be approximately 412° F. T3, in contrast, will be approximately the temperature of saturated steam at atmospheric pressure, or 212° F. Steam traps are generally insulated in order to minimize thermal energy lost to the environment. As illustrated in FIG. 3A, T2 is the gas temperature located just downstream of outlet 228 of steam trap 200. In accordance with embodiments of the present invention, steam trap monitor 230 includes one or more process variable sensors in order to detect one or more steam characteristics proximate outlet 228.

During normal steam trap operation, saturated steam and condensate are both present in trap body 202. This will cause the temperature of trap body 202 to be approximately temperature T1. The steam trap monitor, if mounted directly to steam trap body 202, will also have its casing at approximately the same temperature as body 202, which will again be about equal to T1. If no steam or condensate is flowing out of steam trap 200, the gas temperature, T2, will be about equal to T3 or, for an atmospheric pressure scavenging system, about 212° F. In practice, T2 may be a few degrees higher due to radiation heat transfer from steam trap body 202 and the case of steam trap monitor 230. In at least one embodiment of the present invention, T2 is measured by using a temperature sensor disposed within monitor 230. A reference T2 measurement can be obtained and stored during known non-leaking operation. Then, later measurements can be compared with the reference measurement for steam trap leakage diagnostics.

The temperature descriptions given above are generally true when no steam or condensate is flowing out of trap 200. However, if trap 200 has collected sufficient condensate, buoyant forces lift float 210 and open valve 214. This allows condensate to flow through outlet 228 until the buoyant forces are insufficient to lift float 210. Typically, some saturated steam may also escape during this process, depending on the details of the design of steam trap 200. During the discharge period, the condensate and steam will heat a temperature sensor within steam trap monitor 230 to approximately the temperature of T1 (nearly 412° F.). After the discharge period has ended, the temperature of the sensor within steam trap monitor 230 will gradually return to T2 along a classic first order system decay curve.

In the case of a leaking steam trap, the reading from the sensor (S2) that measures T2 will consistently remain close to that of the saturated steam leaking through the valve. The larger the leak, the better T2 will match the T1 temperature. Preferably, embodiments of the present invention also include a second process variable sensor (preferably a second temperature sensor) that is disposed to measure temperature T1, or the temperature of the casing of steam trap monitor 230 which is thermally coupled to stem trap body 202. Preferably, electronics within steam trap monitor 230 will store readings related to the T1 and T2 temperatures. Over time, an average temperature difference can be determined and stored relative to the T1 and T2 temperatures, excluding the period(s) that the steam trap condensate valve is open. Detecting that the valve is open can be determined by noting a rapid T2 temperature change that results in T2 being approximately equal to T1. Certainly, other techniques and methods can be used to sense the flow of condensate or pressurized fluid through steam trap monitor 230.

Due to the relatively large amount of energy available to purge condensate, steam trap condensate valves are usually only open for brief periods, typically less than one minute. If the temperature (T1) indicated by the sensor proximate the casing of steam trap monitor 230 is nearly equal T2 for long periods of time (such as exceeding 10 minutes) or if the average difference between the readings between the two sensors during periods when the valve should be closed gets below a predetermined threshold, steam trap monitor 230 can provide a leakage indication.

The actual form of the leakage indication can be any suitable annunciation or message transmission. Examples include very inexpensive annunciations, such as providing a local color change at the housing of steam trap monitor 230. The annunciation can also be more sophisticated, such as providing a FOUNDATION™ Fieldbus or HART® compatible alarm wirelessly. Further, the alarm can also be an audible alarm. While a preferred embodiment contemplates providing a wireless alarm, it is appreciated that the process variable sensor may be wired, such as to a two-wire process control loop to both power the sensor and communicate an alarm.

Figure 3B:
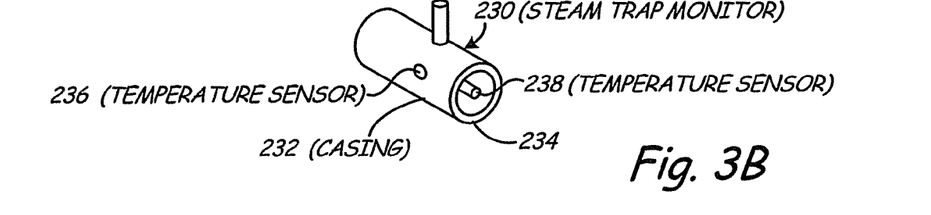
FIG. 3B is a perspective view of a portion of steam trap monitor in accordance with an embodiment of the present invention.

FIG. 3B is a perspective view of a portion of steam trap monitor 230 in accordance with an embodiment of the present invention. Monitor 230 includes casing 232 that includes a surface 234 that is adapted to couple to steam trap body 202 or steam trap outlet 228 in a manner that thermally couples monitor casing 232 to steam trap body 202. Preferably, steam trap monitor 230 employs a plurality of temperature sensors. As illustrated in FIG. 3B, steam trap monitor 230 preferably includes casing temperature sensor 236 disposed to sense a temperature of casing 232. The type of temperature sensor used for temperature sensor 236 can be any suitable device capable of generating, or otherwise providing, an electrical characteristic in response to a temperature. Examples of suitable temperature sensors include thermocouples, thermistors, and resistance temperature devices (RTDs). In one embodiment, temperature sensor 236 is a thermocouple. Steam trap monitor 230 also preferably includes a second temperature sensor 238 that is thermally isolated from casing 232 and disposed to measure a temperature of gas within casing 232.

Figure 3C:
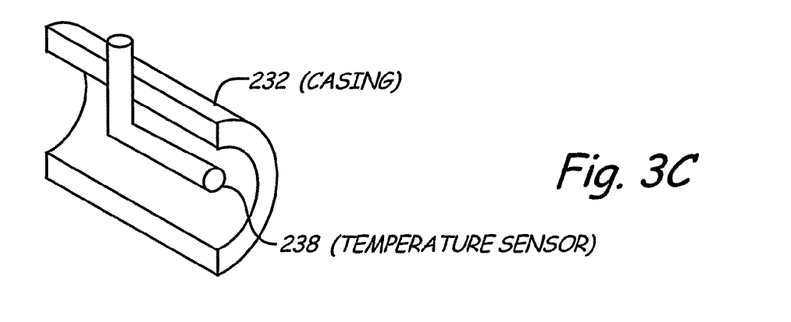
FIG. 3C is a cutaway perspective view of a potion of the steam trap monitor shown in FIG. 3B.

FIG. 3C is a cutaway perspective view illustrating the positioning of temperature sensor 238 in greater detail. As set forth above with respect to temperature sensor 236, temperature sensor 238 can be any suitable device, but is preferably a thermocouple. Further, in a preferred embodiment, casing 232 is a field hardened, plastic enclosure that is substantially waterproof and adapted for exposure to climatological extremes. Further, the temperature measurements do not necessarily require high accuracy, so electronics employing inexpensive, simple microcontroller(s) with an on-chip analog-to-digital converter can be used. However, many other suitable electrical arrangements can be employed for the circuitry of steam trap monitor 230. Such circuitry will be described with respect to FIG. 4.

Annunciation of a steam trap leak is preferably accomplished using a solid black LCD that is integral with housing 232, which LCD preferably changes color, such as to red, if an alarm condition exists. While the descriptions of FIGS. 3B and 3C have illustrated an embodiment employing two temperature sensors, embodiments employing more than two temperature sensors are also practicable. For example, in other embodiments, it may be useful to also measure T3. This is particularly so for cases where the steam is superheated (not saturated) and where its temperature varies over time, or when the water scavenging system pressure varies a great deal. This scavenging pressure variation will cause the saturation temperature to vary. By measuring all of temperatures T1, T2 and T3 independently, the same technical approach described above can be employed to determine if the steam trap is leaking. Such situations can be addressed using only two temperature measurements, but the lag in the S1 measurement of T1 (as T1 changes) should be accounted for in the software algorithm doing the diagnostic assessment. One favorable aspect about superheated steam systems is that the temperature differences between T1 and T3 are generally much larger than in saturated systems. This higher temperature difference allows the leak detection technology to be much more sensitive to small leaks.

Steam traps are also used to eject trapped air. Any air ejected by the trap will have been in intimate contact with the steam at temperature T1, so it will be at a similar temperature. Sensor 238, measuring S2, will respond to the air as if it were saturated steam, except that the air will decompress as it passes through the valve. This decompression reduces the air's instantaneous temperature. For the worst-case scenario, the air exiting may be cool enough so that the leak detector would not detect that the valve had opened. This would not detract from steam trap monitor 230's leak detection function, which generally relies upon sensing the increased temperature of leaked steam, if present, by sensor 238. In actual service, air ejection normally only occurs at start up, or restart up. Under normal conditions, condensate or steam are the only ejected fluids or gasses.

While much of the description thus far has focused upon the sensing of multiple temperatures throughout the steam trap process, sensing different or additional process variables, such as pressure, can also be employed. For example, at each of the locations illustrated by T1, T2 and T3 in FIG. 3A, pressure can also be measured. For example, referring back to FIG. 1, there are three pressures and temperatures illustrated. When movable member 112 closes, the P2 and T2 measurements should be roughly the same as P1 and T1, which are the pressure and temperature of the steam in steam pipe 102. However, when trap 100 opens, the pressure and temperature will be similar to the pressure and temperature in collection/return line 104. By measuring these variables, embodiments of the present invention advantageously "characterize" the behavior of the steam trap when it is new and in good working order. However, as the steam trap ages and develops a leak, the behavior of the trap will be different. If there is a leak, then P2 and T2 will behave significantly differently. Rather than becoming nearly equal to the steam pipe pressures and temperatures, P2 and T2 would be slightly lower. Additionally, instead of being nearly equal to the pressure and temperature (P3, T3) in return line 104, P2 and T2 will be slightly higher. The degree to which these relationships occur will generally depend on the nature and degree of the leak. However, by measuring P1, T1, P2, T2 and P3, T3 it is believed that embodiments of the present invention can compare the current state of the trap (which may be leaking) to a characterized state (such as when it was commissioned or determined to be in good working order). This comparison then allows a technician or controller to determine whether the steam trap is leaking, and even the degree to which it is leaking.

Figure 4:
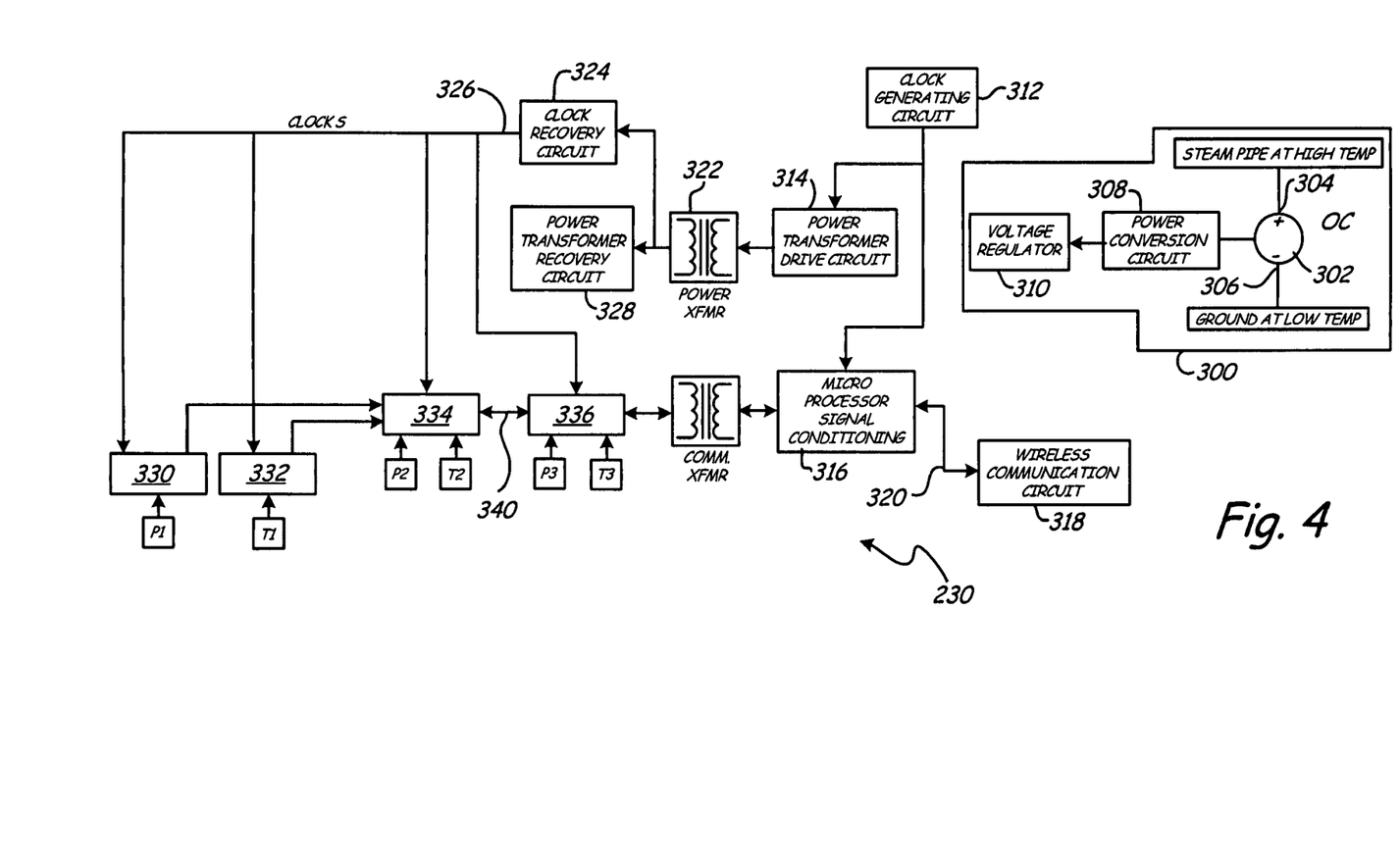
FIG. 4 is a block diagram of electronics within a steam trap monitor in accordance with embodiments of the present invention.

FIG. 4 is a block diagram of electronics within a steam trap monitor in accordance with embodiments of the present invention. Steam trap monitor 230 generally includes a local source 300 of power. Local power source 300 is generally able to provide all required electrical power to the rest of circuitry within steam trap monitor 230 without requiring any wired connections to the external environment. Examples of power module 300 can include an internal battery, as well as, or in addition to, devices that are adapted to generate electricity. Such devices include wind generators, solar cells, circuitry that generates electricity from vibration, and thermal generators. In a preferred embodiment, module 300 includes thermal generator 302 that generates electricity from heat flow. Known examples of thermal generator 302 include thermocouples and devices that employ the Peltier effect. Accordingly, one side 304 of generator 302 is coupled to a source of high temperature, such as steam pipe 102. While another side 306 of thermal generator 302 is coupled to a relatively lower temperature, such as the ambient environment. In accordance with known concepts, the presence of a temperature differential across sides 304 and 306 of thermal generator 302 will generate electricity that is supplied to power converter circuit 308. Circuit 308 can include any combination of suitable circuitry to condition, amplify, or otherwise adapt the electricity provided by generator 302 into a more suitable form. Additionally, voltage regulator 310 can be employed and coupled to power conversion circuit 308 to provide a stable voltage for the circuitry of steam trap monitor 230. Although no connecting lines are illustrated tying module 300, or voltage regulator 310 to additional components within steam trap monitor circuitry, such notation is provided for clarity. In fact, the output of power module 300 is actually coupled to all circuits within the steam trap monitors that require electricity.

Power module 300, in some embodiments, is able to operate even when steady state energy conversion levels do not meet the needs of steady state power consumption. For example, power module 300 may cause the monitor to go into a low-power state wherein electrical energy consumption is curtailed significantly while energy is stored. Then, periodically the monitor can be powered up, check for a leak, generate an indication, if appropriate, and return to its low-power state. Additionally, the monitor can receive a wireless, or local operator, command to enter a low-power mode. In this manner, effective steam trap monitor operation can be effected using relatively little steady state energy. While a preferred embodiment illustrates the use of a local source of power 300, an alternative embodiment allows for connection to a wired source, such as a two-wire process control loop to both power the steam trap monitor and provide communication to and from the monitor.

The steam trap monitor circuitry also preferably includes a clock 312 generating a clock signal that is provided to power transformer drive circuit 314 and microprocessor and/or signal conditioning module 316. The provision of a clock signal helps maintain synchronicity among the circuitry of steam trap monitor 230. Microprocessor/signal conditioning circuitry 316 can be any circuitry that is adapted to execute code to provide functions within steam trap monitor 230. Microprocessor/signal conditioning module 316 is coupled to wireless communications module 318 through data bus 320.

Wireless communications module 318 receives data from circuitry 316 and generates appropriate wireless communication signals based thereon. Additionally, wireless module 318 can receive wireless communications and provide data relative to the wireless communications to microprocessor/signal conditioning circuitry 316 through data bus 320. Examples of wireless communication module 318 include any technology now known or later developed that is able to provide or transmit information without wires. Wireless communication 318 can communicate process-related information as well as device-related information. Depending upon the application, wireless communication module 318 may be adapted to communicate in accordance with any suitable wireless communication protocol including, but not limited to: wireless networking technologies (such as IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Service (GPRS), Code Division Multiple Access (CDMA), spread spectrum technology, infrared communications techniques, SMS (Short Messaging Service/text messaging), or any other suitable wireless technology. Further, known data collision technology can be employed such that multiple units can coexist within wireless operating range of one another. Such collision prevention can include using a number of different radio-frequency channels and/or spread spectrum techniques.

Monitor 230 can push steam trap leakage indication(s) to one or more designated receivers of such information periodically, or upon the occurrence of an event such as a determination of steam trap leakage. This leakage indication can be an indication of non-leakage, leakage, both, or any other suitable indication. Additionally, monitor 230 can also provide such information upon request. This request may come in the form of a wireless command received via module 318, or via a local operator interface (not shown). The request may be directed to a single monitor address, or to a group of monitors within wireless range. Additionally, the request could be generated periodically, such that each monitor is periodically polled for leakage information.

Power module 300, power transformer drive circuit 314, clock generating circuit 312, microprocessor/signal conditioning 316, and wireless module 318 are preferably electrically isolated from the measurement circuitry of monitor 230. This isolation is preferably in the form of transformer isolation, but may take any suitable form. Clock recovery circuit 324 is coupled to power transformer 322 and is adapted to provide a clock signal 326 that is preferably identical to that of clock generating circuit 312. Additionally, power transformer recovery circuit 328 is also coupled to power transformer 322 and generates electricity for measurement circuits from energy provided by power transformer 322. While power transformer recovery circuit is illustrated as not being coupled to additional components, such notation is provided for clarity. In fact, power transformer recovery circuit 328 is operably coupled to all measurement circuits that require electricity.

As set forth above, embodiments of the present invention preferably employ a plurality of process variable sensors to detect steam leaks. FIG. 4 illustrates circuitry of steam trap monitor 230 employing a plurality of measurement modules 330, 332, 334 and 336. Each module is configured to generate a digital indication of a process variable by interacting with a process variable sensor. Some modules can be configured to interact with a plurality of process variable sensors as well as other measurement modules. For example, module 334 is able to obtain pressure measurement P2 and temperature measurement T2, as well as communicate with module 336 over bus 340. Measurement modules 330, 332, 334 and 336 can be any circuit able to generate digital process variable information by interacting with process variable sensors. Thus, an analog-to-digital converter could be considered a measurement module. Further, an entire Application Specific Integrated Circuit (ASIC) with one or more analog-to-digital converters, a multiplexer, and additional circuitry for linearization or compensation could also be considered a measurement module. Preferably, modules 334 and 336 are ASICs with an internal capacitance-to-digital converter. Additionally, it is preferred that module 330 include a capacitance-to-digital converter, while module 332 have a voltage-to-digital converter. However, other combinations can be employed in accordance with embodiments of the present invention.

Figure 5:
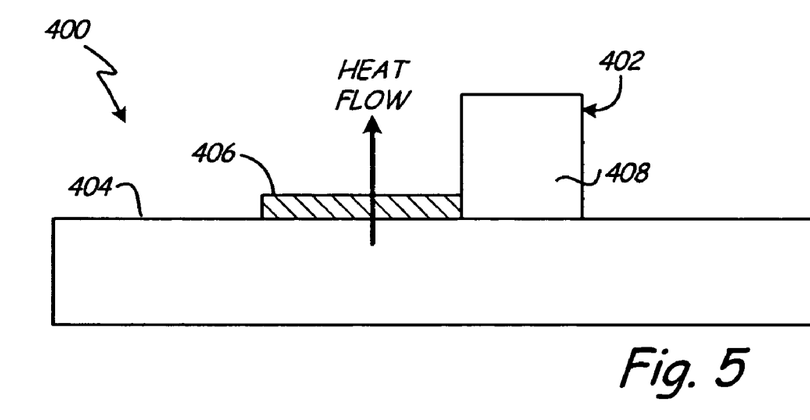
FIG. 5 is a simplified diagram of steam trap monitor coupled to a steam trap exhaust.

FIG. 5 is a simplified diagram 400 of another embodiment of a steam trap monitor 402 in accordance with the present invention. Steam trap monitor 402 couples to a steam trap exhaust 404 and includes a process variable sensor 406 configured to couple proximate a potential leak location such as the steam trap exhaust 404. This is but one example of a potential leak location and any potential leak location can be used. Steam trap monitor 404 also includes circuitry 408 which is powered from electricity generated by process variable sensor 406. In one configuration, process variable sensor 406 comprises an electric generator configured to generate electric power in response to a process variable. The process variable is related to the occurrence of a leak in the steam trap. For example, the electric generator 406 can comprise a thermal electric generator and the process variable can comprise heat. In such a configuration, the electric generator 406 provides an electrical output to circuitry 408 in response to a heat flow. If the electricity provided to circuitry 408 is sufficient, the circuitry 408 will be activated and can provide an output indicative of the occurrence of leak in the steam trap.

The exhaust 404 of the steam trap can be connected to a recovery system or vented to atmosphere. In either case, as the steam begins to leak, the temperature of the exhaust 404 begins to rise. Rather than measuring the temperature rise, a thermo-pile or thermal electric device generates power from the steam leak. As the leak intensifies, more power is generated. At some point, enough energy is generated (and optionally captured) to allow circuit 408 to operate. Circuit 408 can then provide an output which indicates that a leak in the steam trap has occurred.

Figure 6:
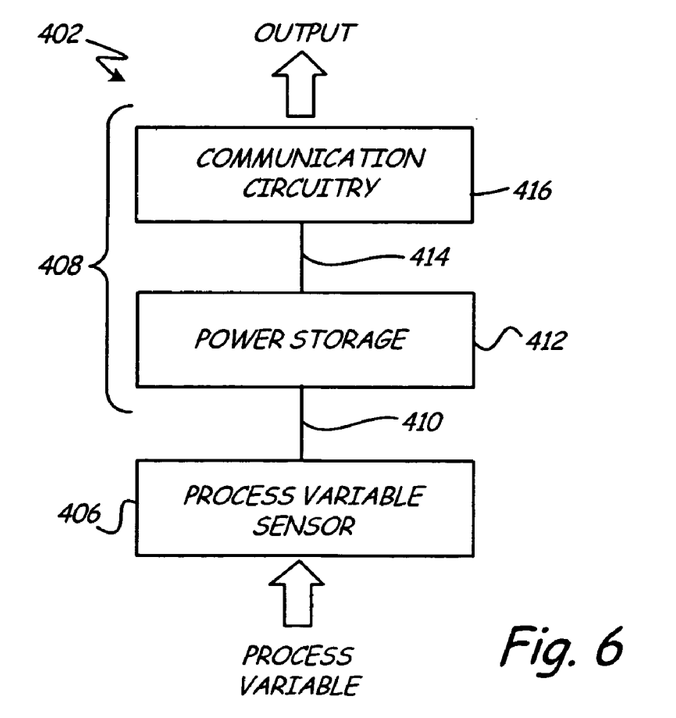
FIG. 6 is a simplified block diagram of the steam trap monitor of FIG. 5.

FIG. 6 is a simplified block diagram of steam trap monitor 402. As illustrated in FIG. 6, the process variable sensor 406 receives a process variable and provides an electrical output to a power storage and power source circuitry 412. For example, circuitry 412 can comprise a capacitor which is charged by electricity 410. If the leak is a slow leak, the capacitor will charge over an extended period of time. However, the capacitor will charge quickly in response to a fast leak. A voltage regulator can be used to provide regulated power 414 to communication circuitry 416.

Only a small differential temperature is required to generate the power needed for communications. The process variable sensor 406 comprises a thermal electric generator, the thermal electric generator can be configured to radiate heat to the ambient environment. Typically, a heat sink or other type of cooling device can be used to ensure a sufficient temperature gradient across the thermal electric generator. For example, a 30° C. temperature differential will generate approximately 50 mW of power. However, wireless communication circuitry can be configured to operate on as little as 15 mW.

The communication circuitry 416 provides an output. The output can be any type of output such as those discussed above including a wireless output or a wired output. In another example, the output comprises a local output such as an audible alarm, a visible alarm, etc. The output can also be provided to a controlled device. For example, the output can be used to shut down equipment in response to the steam leak.

Although the present invention has been described with reference to preferred embodiments, workers skilled in the art will recognize that changes may be made in form and detail without departing from the spirit and scope of the invention. For example, if wireless communication is employed, a self-organizing network can be used to simplify installation. In one example, the power storage device comprises a super capacitor.

What is claimed is:

1. An electronic steam trap monitor comprising:
   a process variable sensor comprising an electric generator configured to couple to a steam trap proximate a potential leak location and generate electricity in response to a temperature differential proximate the potential leak location, the electricity generated from heat energy taken from the process;
   a power storage and power source coupled to the process variable sensor configured to store power from the electric generator;
   wireless communication circuitry coupled to the power storage and power source configured to provide a wireless output in response to electricity generated by the electric generator, the communication circuitry powered by electricity generated by the electric generator; and
   wherein the wireless communication circuitry provides an output indicating that a leak on the steam trap has occurred only when energy is generated by the electrical generator reaches a level sufficient to meet the needs of steady state power consumption required to operate the wireless communication circuitry.

2. The apparatus of claim 1 wherein the wireless output comprises an RF output.

3. The apparatus of claim 1 including a local output comprising a local alarm.

4. The apparatus of claim 1 wherein the electric generator couples to a heat sink.

5. The apparatus of claim 1 wherein the electric generator couples to a steam trap exhaust.

6. The apparatus of claim 1 including a power storage device.

7. The apparatus of claim 6 wherein the power storage device comprises a battery.

8. The apparatus of claim 1 wherein the communications circuitry provides the output when energy from the electrical generator reaches a level.

9. The apparatus of claim 8 wherein the level comprises an energy level which is sufficient to power the communications circuitry.

10. A method of monitoring a steam trap, comprising:
    coupling an electric generator to a steam trap proximate a potential leak location;
    sensing a process variable proximate the steam trap indicative of steam leaking past the steam trap by generating electricity with the electric generator in response to a temperature differential proximate the potential leak location, the electricity generated from energy taken from the process;
    storing power generated by the electric generator in a power storage and power source;
    powering wireless communication circuitry and providing an output using the electricity generated by the generated electricity indicative of a leak in the steam trap only when the energy generated by the electrical generator reaches a level sufficient to meet the needs of steady state power consumption required to operate the wireless communication circuitry.

11. The method of claim 10 wherein the wireless output comprises an RF output.

12. The method of claim 10 including storing power generated by the electric generator.

13. The method of claim 10 including powering the wireless communication circuitry when energy from the electrical generator reaches a level.

14. The method of claim 13 wherein the level comprises an energy which is sufficient to power the communication circuitry.

* * * * *